No. 863,425. PATENTED AUG. 13, 1907.
C. NEWTON & F. E. BROWN.
TWO SPEED AND AUTOMATIC COASTER AND BRAKE HUB.
APPLICATION FILED JUNE 9, 1904. RENEWED JULY 1, 1907.
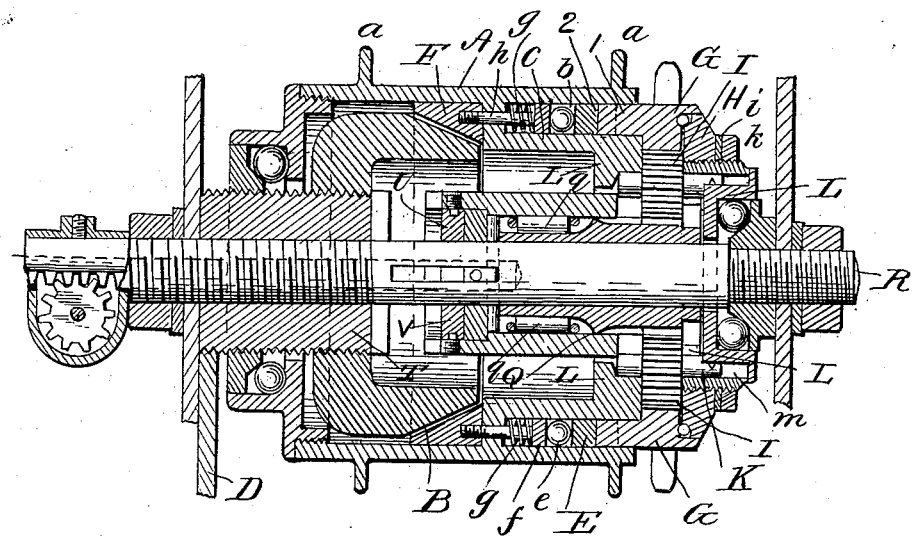
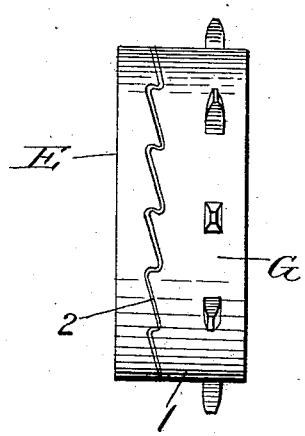 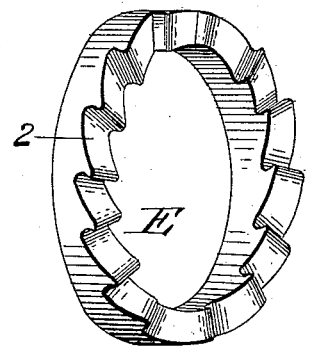
Witnesses
F. L. Orrand
O. McNeil
Inventors
Charles Newton
Fred E. Brown
By Sturtevant & Greely
Attorneys

UNITED STATES PATENT OFFICE.

CHARLES NEWTON AND FRED E. BROWN, OF TORRINGTON, CONNECTICUT, ASSIGNORS TO THE STANDARD SPOKE & NIPPLE COMPANY, OF TORRINGTON, CONNECTICUT, A CORPORATION OF MAINE.

TWO-SPEED AND AUTOMATIC COASTER AND BRAKE-HUB.

No. 863,425.     Specification of Letters Patent.     Patented Aug. 13, 1907.

Application filed June 9, 1904, Serial No. 211,797. Renewed July 1, 1907. Serial No. 381,736.

*To all whom it may concern:*

Be it known that we, CHARLES NEWTON and FRED E. BROWN, citizens of the United States, residing at Torrington, in the county of Litchfield, State of Connecticut, have invented certain new and useful Improvements in Two-Speed and Automatic Coasters and Brake-Hubs, of which the following is a description, reference being had to the accompanying drawing and to the letters and figures of reference marked thereon.

Our invention relates to improvements in hubs for bicycles, automobiles or other self or power propelled vehicles, and in general is of the construction set forth in our application for Letters Patent filed of even date herewith, Serial No. 211,795.

Our invention is illustrated in the accompanying drawings, in which

Figure 1 is a view in central longitudinal section; Fig. 2 is a side elevation of sprocket and brake ratchet collar; and Fig. 3 is a perspective view of said brake ratchet collar.

The two speed and free wheel mechanism is essentially the same as that of our former application, consisting of the sprocket G having an internal gear, the pinions I meshing with sprocket and being supported by pins K, having bearings m in hub A, of the central gear Q, meshing with pinions and being free to revolve on stationary axle R of the clutch sleeve S, surrounding said central gear, with rollers q in slots between same, of the collars U and V, the stationary clutch member T held to a stationary part of the frame through arm D, and the shifting device, all of which is substantially as described and claimed in the above named application.

The features which are novel in this improvement will now be described.

The objects of the improvement in addition to those of our former application, are to provide a brake wholly within the hub, operated directly from the sprocket, the stationary brake member being secured to a stationary part of the frame.

In the drawings, A represents the hub shell, which is recessed at b to receive the brake mechanisms, which are the prolonged end of sprocket G as at 1, having ratchet teeth 2, which operate on corresponding ratchet teeth on brake clutch collar E, said brake clutch collar operating on ball plate f through balls e. The brake member B being stationary it follows that if the brake shoe F which revolves with the hub due to the pins h, be forced against said stationary brake member, the hub will be braked or brought to rest. If the sprocket be revolved backwards as when back-pedaling, the brake shoe F will be forced against the stationary brake member due to the ratchet teeth on sprocket and brake ratchet collar. When the sprocket is again rotated forwards, the brake shoe F will be freed from stationary brake member by the springs g.

It will be seen, therefore, that we have a hub giving a high speed, a low speed, an automatic coaster, and a brake as in our former application, said hub retaining many of the advantages as set forth in the former application, and having also other advantages peculiar to this construction, such as providing a brake wholly within the hub, said brake being operated directly from the sprocket, the stationary brake member being secured to the stationary clutch member either as a separate member, or as a part of said stationary clutch member, both of said members being secured to a stationary part of frame, thus relieving the axle of any strain due to stationary clutch member or brake.

Having thus described our invention, what we claim as new, and desire to secure by Letters Patent, is:—

1. In a hub, the combination with the sprocket having a series of ratchet teeth on its inner face, a ratchet plate in mesh therewith and supported by the hub, a brake shoe, a ball plate connected therewith, balls between the said plate and the ratchet plate, and a stationary brake member, against which the brake shoe bears when the sprocket is rotated backward; substantially as described.

2. In a hub, the combination with the sprocket having a series of ratchet teeth on its inner face, a ratchet plate in mesh therewith, balls bearing against the rear face of the ratchet plate, a plate carried by the hub and bearing against the balls, a brake shoe supported on pins passing through a part of the hub, springs surrounding said pins, and a stationary brake member against which the brake shoe bears when the sprocket is rotated backward; substantially as described.

3. The combination with a hub having an outer wall, a cylindrical portion forming a recess between the two, a sprocket having an inwardly projecting sleeve, with a ratchet plate on its inner face, a ratchet plate surrounding the cylindrical portion of the hub, and in mesh with the ratchet plate on the sprocket, a ball plate and balls, pins passing through that portion of the hub which connects the outer wall to the cylindrical portion, a brake shoe carried by said pin, and a stationary coöperating member; substantially as described.

4. The herein described brake mechanism, comprising a hub having an outer wall and a cylindrical portion with a recess between the outer wall and the cylindrical portion, the sprocket having the prolonged end extending within said recess, a brake shoe inclosed within the hub, and operative connections between the brake shoe and the sprocket whereby said brake shoe is operated by the sprocket when rotated backwardly, and a stationary member against which the brake shoe operates, all said parts being inclosed within the hub; substantially as described.

5. The herein described brake mechanism, comprising the hub, the sprocket supported thereby, and extending within the wall of the hub, a brake shoe inclosed within the hub and operative connections between the brake shoe and the sprocket whereby said brake shoe is operated by the sprocket when rotated backwardly, a change speed mechanism having as one of its elements a stationary clutch member, said brake mechanism including a stationary member secured to the stationary clutch member of the change speed mechanism and against which the brake shoe operates, all said parts being inclosed within the hub; substantially as described.

6. In a device of the character described, a change speed mechanism including as one of its elements a stationary clutch member, a movable brake shoe and a stationary coöperating brake member, secured to the stationary clutch member of the change speed mechanism, the latter surrounding the stationary axle and being attached to a stationary part of the machine frame; substantially as described.

In testimony whereof we affix our signatures, in presence of two witnesses.

CHARLES NEWTON.
FRED E. BROWN.

Witnesses:
S. R. SHEPARD,
E. L. FINN.